April 21, 1959

J. F. LANDUYT ET AL 2,883,599

CONTROL DEVICE

Filed July 25, 1957

INVENTORS.
JOHN F. LANDUYT
BY RUSSELL T. SIMMONS

Andrew L. Hubbard

ATTORNEY

April 21, 1959

J. F. LANDUYT ET AL 2,883,599

CONTROL DEVICE

Filed July 25, 1957

INVENTORS.
JOHN F. LANDUYT
BY RUSSELL T. SIMMONS

ATTORNEY

United States Patent Office 2,883,599
Patented Apr. 21, 1959

2,883,599

CONTROL DEVICE

John F. Landuyt, Chicago, and Russell T. Simmons, Lombard, Ill., assignors to General Electric Company, a corporation of New York Application July 25, 1957, Serial No. 674,194

6 Claims. (Cl. 318—471)

This invention relates to control devices and, in particular, to control devices by means of which the temperature of a cooking vessel, for example, may be held substantially at a predetermined temperature for properly cooking the contents of the vessel.

It has now become popular to equip the surface cooking units of domestic cooking ranges with temperature control devices comprising a thermostat mechanism adapted to regulate the supply of electricity or other heat energy according to the temperature changes of a thermosensing element which is maintained in good heat transfer relation with the bottom of the cooking vessel. Early efforts to control the heat source by means of a conventional thermostat and a thermosensing element maintained in resilient engagement with the wall of the cooking vessel were unsuccessful, because the thermostat could not anticipate the attainment of the control temperature and, therefore, the heat source was not interrupted until the control temperature was reached. This resulted in a substantial "overshoot" of temperature, which of itself would delay the thermostat in reactivating the heat source. The temperature of the material in the cooking vessel would thus be subject to a very wide amplitude. If the cook had adjusted the temperature control device with the objective of having the vessel maintain a "gentle boil" condition, there would instead be periods of violent boiling followed by periods of almost complete quiescence. To the average person, this is a very disturbing situation, and it has resulted in many unnecessary service calls.

Workers in the art have recognized the necessity of having the thermostat anticipate the attainment of the control temperature, whereby it begins to adjust or cycle the heat source as the thermostatic system approaches the control temperature. This is effective to prevent the temperature of the cooking vessel from rising substantially above the control point, and because there is no anticipation on the downside, the device restores the heating effort at the proper time to prevent the undesirable cooling of the cooking vessel. An example of a cycling type of cooking control thermostat is shown in Senn U.S. Patent 2,556,603, granted June 12, 1951, for "Fluid Pressure Cycling System." Thermostats embodying the teachings of the said Senn patent have been used successfully by applicants' assignee herein. However, the specialized thermostatic tube system required for the Senn device added substantially to the manufacturing cost of the apparatus.

It is an object of the present invention to provide a cycling type of thermostatic control which uses a conventional tube system applied to a thermostat mechanism which is conventional in many respects; whereupon the assembly of the apparatus is simplified, its cost reduced, and its operation improved.

In a presently preferred embodiment of the invention, a conventional thermostat having the usual flexible blade assembly to actuate the control means between open and closed positions is equipped with a small synchronous motor of the "Telechron" type. The motor drives a cam which rotates in the plane of operation of the flexible blade. A coil spring is permanently connected between the cam and the blade. When the motor is energized—as by rotating the thermostat control knob from its "off" position to a desired temperature control position, the motor alternately applies and releases tension on the coil spring. The spring tends to pull the blade so as to operate the contacts from the "on" to the "off" position. During the heating up period, in which the temperature of the cooking vessel is relatively low, the spring is not strong enough to separate the contacts, and the full wattage of the heating unit will be maintained. When the control temperature is approached, the spring tension will be sufficient to supplement the effort of the thermal motor system to bring the contacts to their "off" position. With the continued rotation of the cam, however, the tension on the spring is lessened and the contacts will snap back to the "on" position. This action will continue with decreasing "on" time until the control temperature has been attained. At the control temperature, however, the thremostat will cycle the heating unit at a quite constant rate and thus maintain the temperature. If the temperature of the load drops, the temperature-responsive system of the thermostat again assumes control and full heat is applied. The cycling action is continuous and, as will later be apparent, the temperature of the cooking vessel may be maintained within much closer limits than has been possible with manual control, or with thermostatic controls lacking the "cycling" feature.

Other features and advantages of the invention will be apparent from the following detailed description of a presently preferred embodiment thereof, read in connection with the accompanying drawings in which Fig. 1 is a top plan view of a thermostat embodying the cycling device of the present invention;

Figure 1:
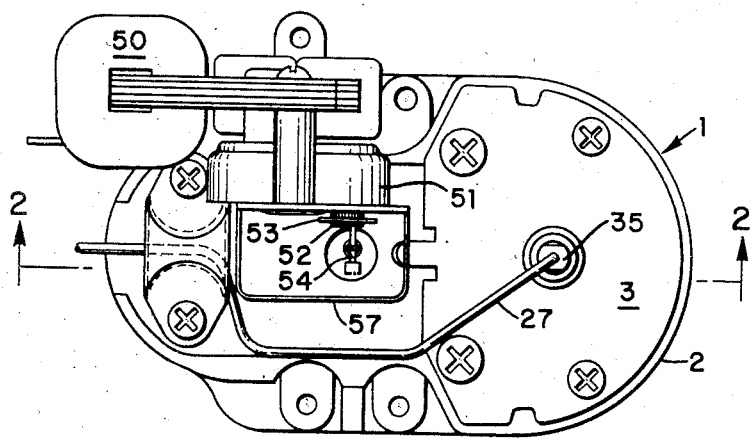
Figure 2:
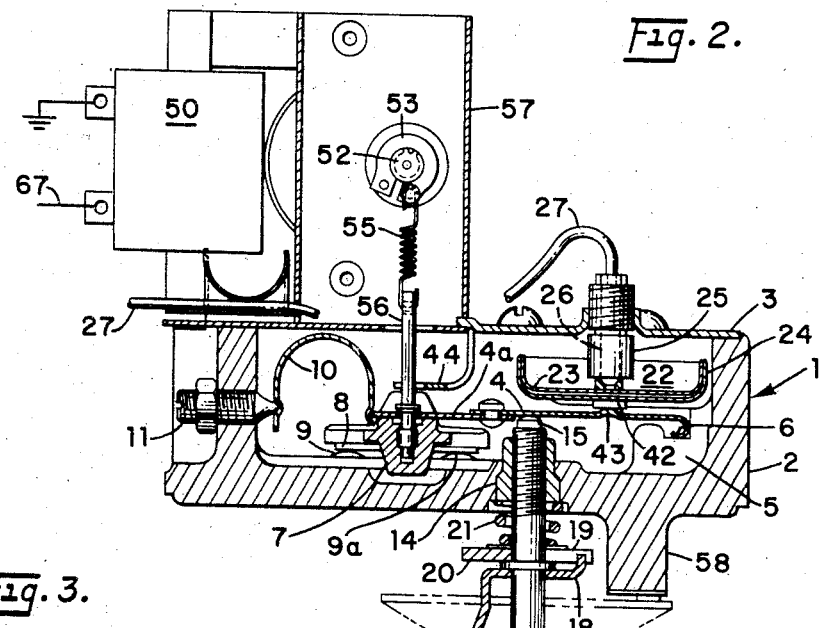
Fig. 2 is a vertical elevation, taken in section on lines 2—2 of Fig. 1.

Referring initially to Figs. 1 and 2, the temperature control device embodying the present invention is basically an essentially conventional thermostat 1 utilizing a hollow molded housing 2, enclosed by a two-piece cover plate 3. A resilient actuating blade assembly 4 (shown here as a two-part member having an extension 4a) is pivotally mounted at one end in a seat structure 5, molded as an integral part of the housing. A convenient way of pivotally mounting the blade is by forming its end portion 6 in cylindrical fashion and suitably confining said end portion within the seat. The opposite or free end of the blade 4 carries a movable contact support 7 which has a pair of bridging contacts 8 which cooperate with fixed contacts 9 and 9a. It will be understood that in the sectional view of Fig. 2, only one of the bridging contacts 8, and only one of the fixed pairs of contacts 9 and 9a are shown; the contact arrangement is actually of the double pole, single throw type. However, the precise contact arrangement is unimportant as respects the present invention. The U-shaped overthrow spring 10 is confined between the end of the flexible blade element 4a and an adjustment screw 11 mounted in the end wall of the housing 2. As is well understood in the art, the bias of the spring 10 influences the amplitude of operation of the thermostat between its closed and open circuit positions.

Figure 4:
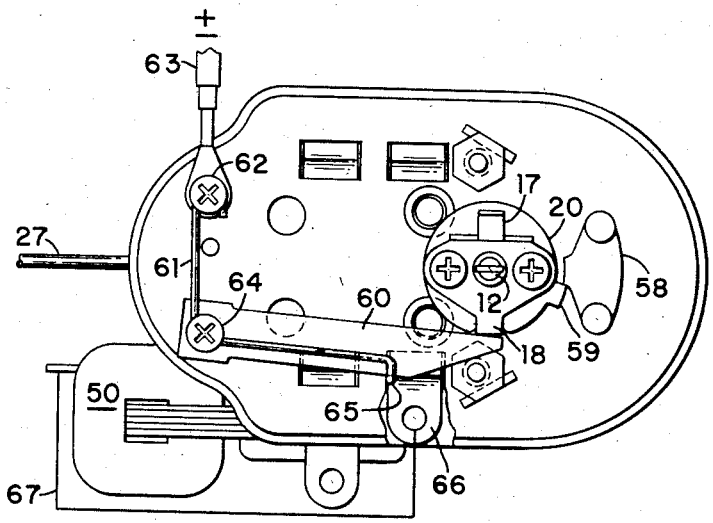
Fig. 4 is a bottom plan view of the control device with the setting knob removed so as better to show the switch mechanism which energizes the cycling motor.

A shaft 12 which is in screw-threaded association with a ferrule 14, molded into the wall of the housing, terminates in a tip 15 which is arranged to bear against the surface of the blade member 4. Said shaft 12 is provided with a knob 16 which is keyed thereto by means of a member 17 having a tongue 18 permanently seated in a slot 19 of a plate 20 carried on the shaft 12. The member 17 and the plate 20 may be secured together by screws or the like, as shown in Fig. 4. The spring 21 is merely a detent spring to interpose friction for preventing unwarranted rotation of the shaft 12.

Figure 3:
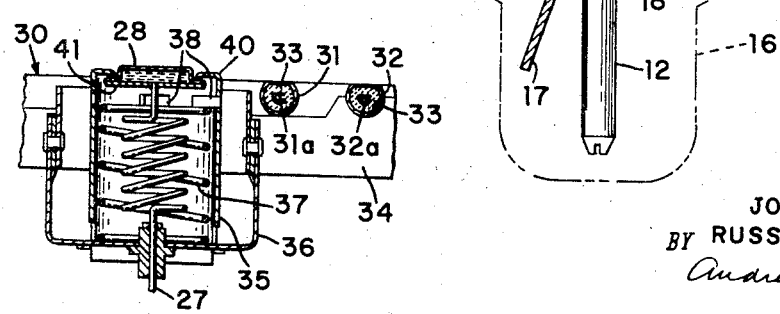
Fig. 3 is a fragmentary sectional view of a thermal sensing head useful with the control device of Fig. 1.

The closure plate 3 adjustably mounts a thermal element or diaphragm 22 which comprises an inner cuplike element 23 telescoped within a flexible outer element 24. The inner element 23 is fitted with a rigid tubular structure 25 having a passage 26 therethrough. The said passage extends through the element 23 and thereby communicates with the interior of the diaphragm 22. The capillary tube 27 is brazed or welded to the member 25. At its opposite end, the capillary tube 27 communicates with the thermosensing capsule 28 (Fig. 3) which is resiliently mounted in a structure arranged to be supported in the center portion of an electric heating unit 30 which may be the surface heating unit of an electric cooking range or the like. The heating unit is preferably as shown in U.S. Patent No. Re. 22,177, granted September 8, 1942, for "Heating Device." Such a heating unit comprises interlaced heating elements 31 and 32 of the tubular sheathed resistance type in which the respective resistance windings 31a and 32a thereof are embedded in a highly compacted mass 33 of thermally conducting and electrically insulating material, such as finely divided magnesium oxide. The respective heating elements 31 and 32 are mounted on a supporting spider 34 which is arranged suitably to be mounted within the cooking surface (not shown) of an electric range. As is well understood in the art, the heating elements 31 and 32 are adapted to be energized in various circuit combinations in a conventional three wire, single phase, Edison circuit carrying 230 volts of alternating current. Multi-position switch means (not shown) are provided in the range for the control of the circuit to the heating unit; the contacts of the thermostat system comprise single throw switch means across the 230 volt leads, as is well understood in the art. The cooking vessel (not shown) is placed directly on the flattened surfaces of the heating elements. The capsule 28 is arranged to be held resiliently against the bottom of the cooking vessel resting upon the heating unit. Accordingly, the capsule is mounted within a tubular shield 35 which is carried by a U-shaped bracket 36, fastened to the spider 34. The shield 35 passes slidably through the bracket 36, and is maintained resiliently in position by the coil spring 37 interposed between the bracket 36 and the plurality of tabs 38 lanced out from the side wall of the shield 35. The shield has an inwardly turned flange 40 which engages with the flange 41 extending about the base of the capsule 28. The capillary tubing 27 is coiled to provide a spring arrangement which resiliently urges the capsule 28 into its Fig. 3 position. When a cooking vessel is placed on the heating unit, the spring 37 and the coiled capillary tubing 27 yield, thus permitting the vessel to rest squarely on the heating unit with the capsule 28 resiliently pressed against the bottom thereof. The capsule 28, the capillary tube 27, and the diaphragm 22 are, of course, interconnected and are filled with a suitable expansion fluid. This assembly of capsule, tubing, and diaphragm are frequently referred to in the art as a "thermal motor," for as the filling liquid expands with increasing temperature, the flexible wall 24 of the diaphragm 22 distends and is thus made to perform work. In the thermostat, the head member 42 of the diaphragm bears against a dimple 43 in the blade 4 and flexes the blade between the cylindrical end 6 of the blade and the fulcrum provided by the tip 15 at the end of the rod 12. The expansion or distension of the diaphragm element 24, therefore, induces a clockwise rotation of the end of the blade member 4, as viewed in Fig. 3. In Fig. 3, the contacts are shown in closed position; but as the end of the blade member 4 rotates, it will eventually pass through the overthrow position of spring 10 and cause the respective movable and fixed contacts to disengage with a snap-action. A suitable stop member 44 extending downwardly from the plate 3 limits the amount of separation of the contacts. Since the contacts comprise switching means in the energizing circuit for the heating unit 30, it will be obvious that when the contacts are open, the heating elements will be deenergized. As the heating elements cool, the temperature of the cooking vessel will also cool, thus causing the thermostatic fluid in the thermal motor to contract. The pressure exerted by the diaphragm 22 against the blade 4 therefore relaxes and the blade tends to straighten out. As it does so, it actuates the contacts again to closed circuit position. The vertical adjustment of the fulcrum 15 relative to the surface of the blade 4, establishes the temperature at which the contacts will be moved between their open and closed circuit positions, as is well understood in the art.

The preferred embodiment of our invention, as illustrated in Figs. 1 and 2, provides means for applying to the blade assembly 4, at uniform time periods, a force tending to move the blade in a contact-opening direction. As a practical matter, it appears equally effective to arrange the mechanism to urge the blade in a contact-closing direction. The effort is generated by means of an eccentric operated at a fixed rate of speed. The movement of the eccentric is resiliently applied to the blade, as by a coil spring or the like interposed between the eccentric and the blade. An important function of the spring, as distinguished from an inflexible connection between the eccentric and the blade, is to establish a uniform maximum effort. It is a feature of the invention that the spring becomes the motivating effort in breaking the contacts as the temperature approaches the pre-established control point. For example, the normal maximum amplitude of a conventional thermostat of the type illustrated is about 16° F.; that is to say, when the temperature of the sensing unit reaches a value 8° F. above the control point, the thermostat blade if operating alone, would open the contacts. Under light loads, the thermostat will close the contacts when the temperature drops about 8° F. below the control point. The "flywheel effect" of the heating unit, however, will continue to heat the vessel. If the temperature control were set to establish a moderate boiling condition, the contents of the vessel would boil rather violently for a short period after the thermostat had opened the heating unit circuit. Then, because of the amplitude of the thermostat and the heat lag of the heating unit, the contents of the cooking vessel would cool substantially below the boiling point. As a result, the user would observe periods of rather violent boiling, followed by periods of quiescence. Heavier loads, such as are usual in deep fat frying operations, increase the swings of temperature, and make control by ordinary thermostat arrangements very difficult.

The coil spring tries periodically to move the blade 4 in a contact-opening direction, and the thermostat system embodying our invention will operate to open the contact before the thermal motor system would do so. This anticipation may be 25° F. or more; it is never less than from 5 to 10° F. in advance of the actual control temperature. The effect of the spring is transitory, so the amount of the "off" time is initially small. As the control temperature is reached, the thermal motor system dominates, and immediately thereafter the thermostat system cycles the heating unit under substantially "steady state" conditions characterized by a succession of "on" periods of equal duration, separated by "off" periods which also are of equal duration.

The motor 50 is desirably of the synchronous type, such as the well known 110 v., 60 cycle A.C. "Telechron" motor used in electric clocks and other timing devices. It is advantageous to mount the motor directly upon the cover structure 3 of the thermostat housing. The gear case 51 is arranged to drive the exposed pinion 52 at 3.6 r.p.m. The eccentric 53 is advantageously constructed on the pinion 52 by applying a "Truarc" grip ring about the pinion. As is well known, each of the legs of such a ring is provided with an aperture which ordinarily accommodates a projection on a plier-like tool with which such grip rings are normally applied. One of the holes is utilized for the attachment of a pin 54 which actually provides the eccentric to which the spring 55 is attached. There is thus formed a simple cam-like device having an eccentric throw which is of the order of one-quarter inch in the commercial embodiment of the invention. The pin 56 is suitably anchored in the contact-carrier 7, as shown in Fig. 2, and extends through an aperture to a point of convenient attachment to the spring 55. The cam, spring, and pin are advantageously enclosed within a housing 57.

It will be understood that the spring 55 is "light"; for example, the total length of the relaxed spring is twenty-three thirty-seconds of an inch, and the application of approximately 60 grams will extend it to the maximum operational length of one and five sixty-fourths inches. Nevertheless, this light spring force is effective to produce the desired accuracy of control.

Figure 5:
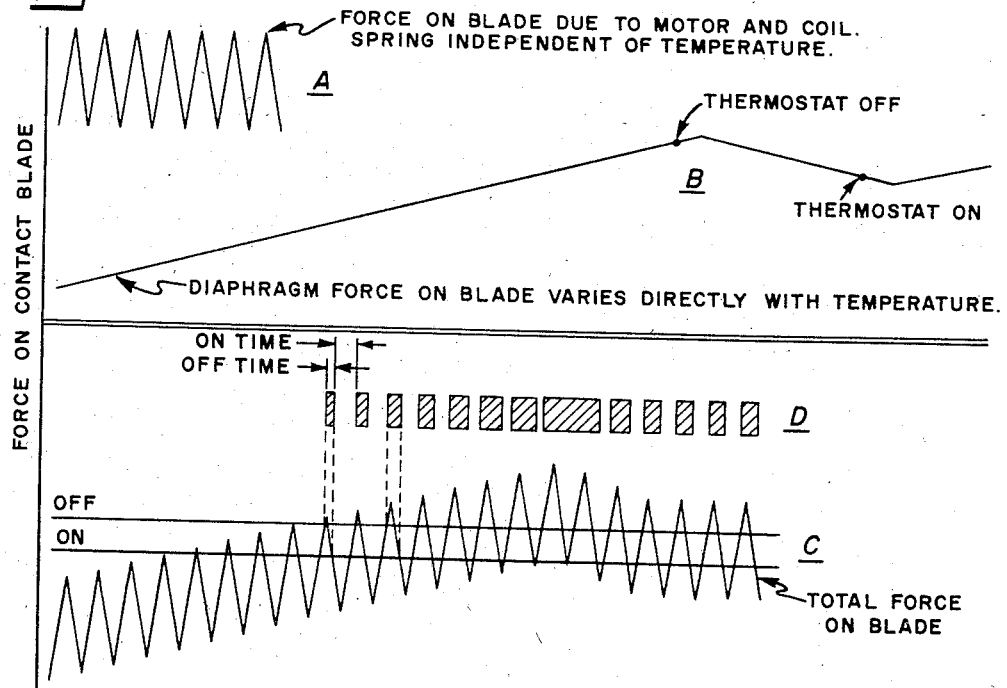
Fig. 5 is a composite figure showing the effect of the cycling spring on the forces applied to the blade and the resulting "on" and "off" actuation of the thermostat.

Fig. 5 is a composite diagram showing the effect of the application of resiliently applied force to the the thermostat blade. The total force on the blade becomes the algebraic sum of the effort of the spring 55, as depicted at "A," and the force which the diaphragm 23 exerts on the blade, as shown at "B." The spring effort is uniform; the diaphragm force applied to the blade varies in direct linear relation with the temperature. In the illustrated embodiment, the force "A" and the upwardly sloping portions of the force "B," are tending to rotate the free end of the blade clockwise of Fig. 2 to provide an open circuit condition. If the spring effort were applied in the opposite direction, as it would be if the motor and cam were placed on the opposite side of thermostat housing, the respective efforts would be in opposition. This is not, however, the preferred arrangement. The motor 50 is arranged to be energized coincidentally with the rotation of the knob 16 from an "off" position to any desired control-setting position. As in the embodiment shown in Fig. 4, this may be accomplished by a simple series switch which utilizes one of the fixed contact terminals of the thermostat. Fig. 4 is a top plan view of the control device with the setting knob removed and a portion of the housing broken away to disclose one of the fixed contact bus connections. It will be recalled that the adjustment shaft 12 carries the mutually attached members of which a tongue 18 extends into a slot 19 in the member 20 (Fig. 2). This arrangement operatively connects the knob 16 and the shaft 12. The housing portion 2 has a molded stop 58 having a projection in the path of movement of a shoulder 59 on member 20. Fig. 4 represents the "off" position of the shaft 12. When the shaft is rotated clockwise of Fig. 4, it will be axially withdrawn relative to the blade assembly 4.

An insulated switch arm 60 is pivotally attached to the housing for rotation in a plane below the plane of the shoulder 59. Said switch arm is in the arc of movement of the tongue 18; and when the knob is in its "off" position, the tongue engages the edge of the arm 60 and rotates it a few degrees in a clockwise direction. The arm is biased for rotation in a counterclockwise direction by means of a stiff conductor 61 which is preferably of suitable spring wire. One end of the conductor is anchored to the housing 2 by means of the screw 62 which forms a connection between the conductor 61 and a line conductor 63. The spring wire conductor 61 extends about the pivot screw 64, then runs above the lever 60 until a point of offset at which the free end 65 of the conductor 61 extends down through an opening in the housing 2. The terminus of the conductor 61 is in operative relation to the bus 66 of one of the fixed contacts 9a; when the knob is in its "off" position, the tongue 18 rotates the lever 60 to move the conductor 61 terminus away from bus 66; and when the tongue 18 disengages from the lever 60—as it will shortly after the control knob is rotated from its "off" position—the self bias of conductor 61 causes said conductor to engage the bus 66. By connecting one of the terminals of the motor 50 to the bus 66, as by the conductor 67 schematically shown, the conductor 61 and bus 66 constitute a single pole, single throw switch in the motor circuit.

The diaphragm 22 is adjusted relative to the back plate 3 and the blade 4 so that even at the lowest ambient temperature—for example, 50° F. in a domestic appliance thermostat—the head 42 of the capsule is in contact with the dimple 43 on the blade. This established a flexure point of the blade, and when the adjustment knob 16 is rotated to an "off" position, the blade is flexed upwardly, as viewed in Fig. 2, and the respective movable and fixed contacts are broken. However, when the knob is rotated to a control point at the lowest point of the temperature control range, the shaft 12 has withdrawn sufficiently to permit the tension in the blade 4 to carry the blade through the overthrow point of spring 10, whereupon the contacts will be closed and the thermostatically controlled heating system will be in operation. The motor 50 is also then in operation, as above noted, and the rotation of the pinion 52 provides the eccentric action which periodically tensions and releases the spring 55.

At this stage of operation, the temperature of the sensing element 28 is well below the control temperature and the total forces on the blade resulting from the thermal motor and the spring 55 are insufficient to flex the blade as required to open the circuit. The contacts remain closed as the temperature of the sensing element 28 approaches the operational zone of the thermostat as represented by the spacing between the "on" and "off" lines of portion "C" of Fig. 5. When the total force on the blade—that is, the thermal motor force, plus the spring force—becomes sufficient to throw the blade to its contact open position, the contacts will remain open for a very small interval represented in "C" by the spacing between the instant the total force representation traverses the "off" line and its traversal of the "on" line; for at this temperature condition, it is necessary for the spring to exert substantially its maximum effort to move the blade to open circuit position at this temperature condition. Almost as soon as the spring begins to relax, the blade will return to the closed contact position. The contacts will remain closed for the period during which the total force curve is below the "off" line. As the temperature increases at the sensing element 28, less effort of spring 55 is required to move the blade to "off" condition with the result that the total "off" time increases and the "on" time decreases. At the maximum temperature condition, the force within the thermal motor system itself becomes the paramount factor. The resultant cycling of the heating element is thus decreasingly the result of the spring action. As shown at "D" of Fig. 5, there is an area of control in which the "off" time is substantial, and yet the total force on the blade, which at this stage is largely the sole effect of the thermal motor, does increase. The prolonged "off" time rather quickly brings the blade action to a steady state of operation in which the cumulative effect of the spring and the thermal motor produce the characteristic pattern of "on" and "off" periods indicated at the right-hand end of representation "D."

In a conventional laboratory test, a control device embodying our invention was set to bring one quart of water to a control temperature of 200° F. and to maintain said temperature for a suitable period. The heat source was a cooking unit of a conventional electric range and a conventional aluminum cooking utensil was employed. At the commencement of the test, the water temperature was approximately 70° F. The heating unit remained on continuously for four minutes, at which point the water temperature reached 195° F. and the thermostat opened the contacts. The thermal motor had not yet assumed control of the heating unit and a continued cycling of the thermostat system resulted in an overshoot temperature of 208° F. At this time, the thermal motor had assumed complete control, whereupon the heating unit remained off sufficiently to reduce the temperature to just above the desired control point. At that stage, the cycling of the control system maintained the water temperature within the narrow range of from 201° F. to 204° F. This steady state condition continued for approximately seven minutes, after which the test was discontinued.

An identical test was conducted with the same control device, except that the motor 50 was disconnected from power and the spring 55 completely relaxed, thus simulating a conventional non-cycling thermostatic control system. Five minutes after the beginning of the test, the water temperature reached 210° F., at which point the thermostat contacts opened for the first time. The temperature rose to 211° F. and then dropped to 199° F. During the eight minutes thereafter, the temperature of the water in the test vessel varied between 199° F. and 211° F.

While there has been described what is at present considered to be the preferred embodiment of the invention, it will be understood that various modifications may be made therein, and it is intended to cover in the appended claims all such modifications as fall within the scope of the invention.

We claim:

1. A device for controlling an electric circuit in response to change in the physical condition of an element, comprising a housing, a flexible blade-like operating member pivotally mounted at one end in said housing and having adjacent its free end an electric switch means for controlling flow of electrical energy in said electric circuit, said operating member opening or closing said switch means according to the direction of rotation of said member; means adjustably engaging a face of said operating member intermediate the ends thereof to establish a flexure point; means responsive to the change in the said physical condition of said element and engaging with the opposite face of said member to enforce flexure of said member to effect movement of the free end thereof in one direction upon departure of said change-responsive means from a pre-established standard physical condition and to relax said member upon departure from said standard in the other direction; means for moving the free end of said member quickly between extremes of movement according to the flexure or relaxation of said member, whereby said switch means is operated from one to the other of its circuit positions; a spring connected to said operating member near the free end thereof; a cam mechanically engaging said spring for causing said spring to exert a pulsing effort on said member, said effort being in the plane of movement of said member; a motor for rotating said cam at a fixed rate; an electric circuit for energizing said motor and switch means in said motor energizing circuit, said switch means being closed upon operation of said flexure point establishing means from a first to a second position to initiate operation of said motor.

2. A device for controlling an electric circuit in response to changes in a physical condition of an element, comprising, in combination, a housing; a flexible blade-like operating member pivotally secured at one end within said housing; means responsive to departure from a predetermined standard physical condition to rotate the free end of said operating member through a limited arc and in one or another direction according to the direction of departure from said standard condition; electric circuit control means operated by said blade-like member from one to another electric circuit condition according to the direction of movement of said operating member free end; means for periodically impressing on said blade-like operating member a rotation-inducing bias of which algebraically adds to the rotation effort of said condition-responsive means, said biasing means comprising a cam member mounted for rotation in the plane of movement of said operating member; a cam-driving motor secured to said housing; switch means for energizing said motor for rotation of said cam; and spring means mechanically connecting said cam and the free end of said operating member to periodically exert a bias on said operating member tending to move the free end thereof in a predetermined direction.

3. In a device for controlling an electric circuit in response to changes in a physical condition of an element, said device including a housing, a flexible blade-like operating member pivotally secured at one end within said housing, setting means rotatably carried by said housing and engaging with said blade-like operating member to establish a permanently open electric circuit or optionally to establish a desired reference level of said physical condition, means responsive to departure from said reference level to rotate the free end of said operating member through a limited arc and in a direction according to the direction of said departure, and electric switch means operated by said blade-like member from one to the other circuit condition according to the direction of movement of said operating member; the combination comprising means for periodically impressing on said blade-like member a rotation-inducing bias which algebraically adds to the rotation effort of said condition responsive means, said biasing means comprising a spring having one end secured to said blade-like member near the free end thereof, electric motor driven cam means secured to the other end of said spring to alternately stress and relax said spring in a direction parallel to the plane of rotation of said operating member, an electric circuit for energizing said motor, and switch means in said circuit operable to close said motor circuit upon rotation of said setting means from the said open circuit establishing means.

4. A device for controlling an electric circuit in response to changes in the temperature of an element, comprising, in combination, a housing, a flexible blade-like operating member pivotally secured at one end within said housing, means responsive to departures from a pre-established standard temperature to rotate the free end of said operating member through a limited arc and in a direction according to the direction of departure from said standard, electric switch means operated by said blade-like member from one to the other circuit condition according to the direction of movement of said operating member free end, means for periodically impressing on said blade-like member a rotation-inducing bias which is effective to operate said switch means to open-circuit condition at a temperature of said temperature-responsive means which is at least from 5 to 10° F. lower than that at which the temperature-responsive means alone would effect an open circuit condition, said biasing means comprising a spring having one end secured to said blade-like member near the free end thereof, motor driven cam means secured to the outer end of said spring to alternately stress and relax said spring in a direction parallel to the plane of rotation of said operating member free end, and means for energizing said motor-driven cam means.

5. Mechanism for controlling the flow of energy to a heating element in response to a change in temperature of an object being heated thereby: comprising a housing;

a blade-like, resilient, operating member fixed at one end in said housing and having its opposite end free to move; control means operated by movement of said free end between first and second operative positions respectively to effect and interrupt energy flow to said heating element; fulcrum means within said housing intermediate the ends of said operating member; means within said housing intermediate said fulcrum means and the fixed end of said operating member and movable in response to a change in temperature of said object to exert mechanical effort on said member to flex said member between said fulcrum means and said fixed end and thereby cause the free end of said operating member to operate said control means to one of its said operative positions; means for adjusting said fulcrum means to a desired operative position relative to said operating member to establish the extent of movement of said temperature responsive means necessary to effect said flexure; coil spring means mechanically connected to said operating member adjacent the free end thereof; electric motor means for periodically tensioning and relaxing said coil spring, whereby to impress a pulsating effort on said operating member tending to move the free end thereof in a predetermined direction; an electric circuit for energizing said motor; and switch means responsive to adjustment of said fulcrum means to a predetermined operative position to complete the circuit to said motor.

6. Mechanism for the control of a heating element in response to a change in temperature of an object being heated thereby: comprising a housing; a resilient, blade-like, operating member mounted at one end within said housing and having its opposite end free to move; means operated by movement of said free end from a first to a second position to control the application of heat energy to said heating element; a thermal motor mechanism responsive to changes in temperature of said object, said thermal motor mechanism having means within said housing engaging with said operating member to effect movement of the free end thereof in a control-means operating direction according to the direction of departure of said object from a preselected temperature; manually operable means for adjusting the operating member to maintain an "off" position of said control means or, optionally, to establish an operating member condition to operate said control means to maintain said preselected temperature; an electric motor fixed relative to said housing; an electric power circuit for energizing said motor; an eccentric; means for rotating said eccentric by said motor at a fixed speed; spring means disposed between said eccentric and said operating member to exert a resilient pulsing effort on said operating member near the free end thereof whereby the said pulsating effort adds algebraically to the mechanical effort exerted by said thermal motor means to effect operation of said heat energy control means; and switch means operated by manipulation of said operating member adjustment means between said "off" position and said temperature control condition to control the flow of electric energy to said motor.

References Cited in the file of this patent

UNITED STATES PATENTS

| | | |
|---|---|---|
| 2,549,461 | Haller | Apr. 17, 1951 |
| 2,702,843 | Taylor | Feb. 22, 1955 |